INVENTOR.
ROBERT J. VOGT
CHARLES E. WILSON

2,922,879
PULSE STRETCHER

Robert J. Vogt, Pittsford, and Charles E. Wilson, Rochester, N.Y., assignors to General Dynamics Corporation, a corporation of Delaware Application June 25, 1957, Serial No. 672,534

4 Claims. (Cl. 250—27)

This invention relates to systems for short electric pulses and, particularly, is directed to means for reducing a series of pulses of random duration, random repetition frequency, and random amplitude to a series of pulses of like characteristics but in which each pulse is of constant duration.

The echo or video signal in radar, distance measuring equipment, radio navigation systems, and the like, is usually of small amplitude and very short duration. To operate cathode-ray display equipment, for example, it is desirable to preserve the amplitude information but to lengthen or "stretch" the pulses to a more usable length.

A pulse stretcher of the type shown on Page 282 of "Very High Frequency Techniques," volume I, by Radio Research Laboratory staff of Harvard University, Mc-Graw-Hill Book Company, 1947, comprises a storage condenser for receiving the energy of the received echo or video pulse, and a discharge circuit for returning the condenser to zero or reference charge after each read-out. The charging circuit for such a condenser includes a diode which, inherently, has considerable contact potential. Diodes with heated cathodes have the so called "dark" current, and the potential across the anode-cathode may amount to ½ to 2 volts. When such a diode is in the charging circuit of the storage condenser, a pulse of two volts or less is completely obscured in the "dark" current of the rectifier.

The object of this invention is to provide an improved pulse stretcher.

A more specific object of this invention is to provide an improved pulse stretcher which will respond to pulses of all amplitudes from zero upwardly.

The objects of this invention are attained by connecting the resistor of a cathode follower in series with a diode across a storage condenser and adjusting the normal current in the resistor to statically bias the diode away from its dark current region. The discharge circuit, on the other hand, comprises a triode gate, without an anode voltage source, connected directly across the storage condenser and controlled by a local monostable multivibrator which in turn is controlled by the pulse to be stored. Thus, the condenser is charged to a level proportional to pulse amplitude, regardless of the pulse amplitude, and the charge is held for the duration of the multivibrator pulse.

Other objects and features of this invention will become apparent to those skilled in the art by referring to specific embodiments described in the following specification and shown in the accompanying drawing in which.

Figure 1:
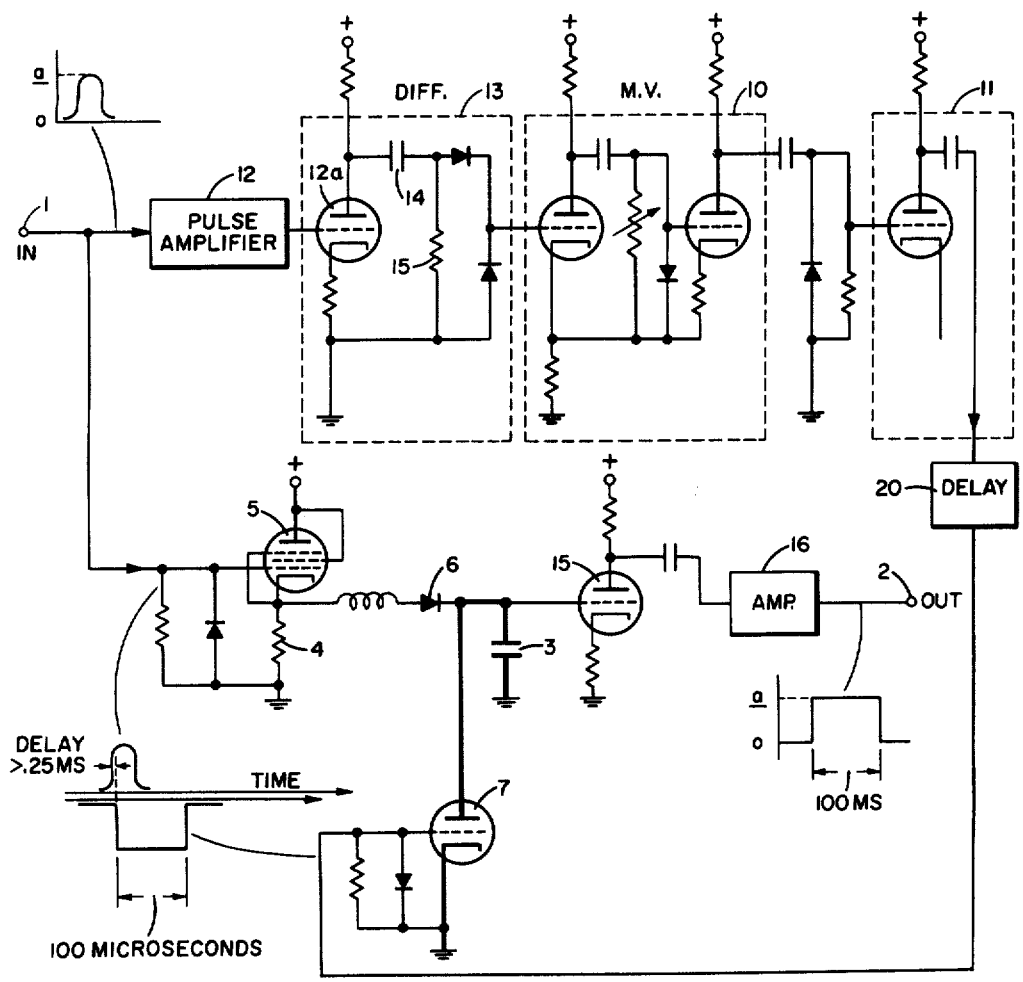
Figure 1 is a circuit diagram of one embodiment of this invention.

Pulses to be received, stretched, and thereafter utilized in an indicating, recording, or other utilization circuit is applied to input terminal 1, Figure 1. Such a pulse could, for example, be received from the video amplifier of a radar receiving set. The pulses thus received are of many amplitudes, $o$ to $a$, and may vary in duration from a fraction of a microsecond to a large fraction of a second. The information to be extracted from the received pulses is usually the amplitude thereof, but because of the short durations they cannot, as a practical matter, be used. After stretching to a constant duration of, say, 100 microseconds and carefully preserving the amplitude information, the pulse is fed out at the terminal 2, Figure 2.

According to this invention, the pulse is applied to the storage condenser 3, which preferably is of a high-quality low-leakage condenser and is adapted to be charged to a level proportional to the amplitude of the applied pulse. The charging circuit, according to one specific embodiment of this invention, comprises the output coupling resistor of an amplifier such as the cathode resistor 4 of the cathode follower amplifier 5. To the control grid of amplifier 5 is applied the pulse from terminal 1. In series with the resistor 4 and across the storage condenser 3 is connected the diode rectifier 6. The rectifier is so polarized that current may flow easily into condenser 3 but cannot flow in the opposite direction. The forward resistance of commercially obtainable rectifiers may be in the range of one ohm, and the back resistance may be in the range of megohms.

Figure 2:
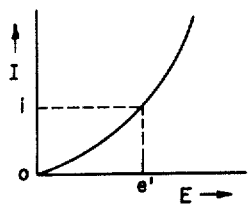
Figure 2 is the voltage current characteristic of a diode employed in Figure 1.

The rectifier 6, whether of the thermionic or semiconductor type, has the general forward voltage-current characteristic shown in Figure 2. It can be seen that the characteristic slope is small for low terminal voltages and that the forward internal resistance is quite high. Worse, the resistance in the low voltage region is usually erratic. According to this invention, rectifier 6 is permanently biased to a value $e'$, which in Figure 2 is well outside the erratic range of operation and where the resistance is at a stable low value. Conveniently, the bias on the cathode follower is adjusted to produce a no-signal space current which, through resistor 4, produces the voltage $e'$. Then, when the incoming pulse from terminal 1 is applied to the control grid of 5, a pulse current is superimposed upon the normal direct current in resistor 4 and, hence, finds a low resistance path to the ungrounded plate of the storage condenser 3.

For the charging current thus supplied to the condenser to be meaningful, the condenser charge must start from a reliable reference level, which charge must be established before and after receipt of each pulse. According to an important feature of this invention, the condenser discharge circuit comprises the grid-controlled triode 7 with the anode-cathode path connected directly across the storage condenser 3. No anode potential source is included for tube 7 so that no charge will be imposed upon condenser 3 from tube 7, except said reference charge produced by the forward current $i$ through the diode-triode path 6—7 and the anode-cathode contact potential of tube 7. The tube 7 is biased to cutoff, all electron and ion current flow between the anode and cathode of the tube during the period the pulse-charge is to be held and read-out.

According to an important feature of this invention, the cutoff bias is applied shortly after the beginning of the pulse at terminal 1. Normally, however, the grid of tube 7 is unbiased, permitting condenser 3 to discharge through tube 7 and, upon arrival of pulse at terminal 1, the grid is suddenly driven beyond cutoff to completely isolate condenser 3 excepting only the one-way charging circuit 4—7. To accomplish this gating action, the grid of 7 is coupled to the output of the multivibrator 10 through the limiter stage 11. The multivibrator is of the one-shot type and is triggered by the incoming pulse through amplifier 12. The differentiating circuit 13, including condenser 14 and resistor 15 in the output of the last amplifier 12a, assures precise timing of the square wave with the leading edge of the pulse.

In operation, the pulse received at terminal 1 is simultaneously applied to the multivibrator and to the amplifier 5. When the pulse information appears across resistor 4, the discharge triode 7 is blocked, or gated off, permitting condenser 3 to receive a charge proportional to the amplitude of the pulse. The charge stands in condenser 3 and is read out by amplifiers 15 and 16 until the cutoff bias of tube 7 is removed. As suggested before, the timing of multivibrator 10 may be, say, 100 microseconds thus permitting the duration of the read-out pulse to be 100 microseconds. Yet, after each read out, the condenser is completely discharged.

The circuits of this invention, thus far described, contemplate the simultaneous gating of tube 7 and the application of the pulse to be stored to the load resistor 4 and condenser 3. This simultaneous action will not necessarily result unless the phase shift of the wave front is the same as it moves through the two parallel paths to the condenser. Normally, slightly greater phase shift can be expected in the amplifier-differentiator-multivibrator-limiter path than through the amplifier 5 path. It is desirable to control this phase shift and the time lag of the gate pulse behind the o—a pulse from terminal 1. It is desirable to not unblock triode 7 until after the pulse voltage is applied to condenser 3 to assure that the charge in condenser 3 starts from an accurately predetermined level. According to an important feature of this invention, the delay circuit 20 is inserted in circuit ahead of triode 7. The delay circuit may comprise many conventional multi-section series inductance and shunt capacitance. It has been found that a delay of about .25 microseconds is optimum for all received pulses down to about one microsecond.

Many modifications may be made in the specific circuits shown in Figure 1 without departing from the scope of this invention as defined in the appended claims.

What is claimed is:

1. A pulse stretching circuit comprising a storage condenser, a charging circuit and a discharging circuit connected across said condenser; said charging circuit including the cathode resistor, of a cathode follower amplifier, in series with a diode rectifier, said amplifier being so biased that the voltage drop across said cathode resistor is sufficient to bias said rectifier into the substantially linear low-resistance region of the voltage-current characteristic of the rectifier; said discharge circuit including the cathode-anode path of a grid-controlled amplifier, a pulse source connected to the control circuit of said cathode follower, and a square wave generator connected to the grid of said amplifier, said cathode-anode path being normally conductive in response to the rectifier bias current to normally maintain a reference charge on said condenser.

2. A system for converting received pulses of random duration and random amplitude to pulses of uniform duration and of amplitudes analogous, respectively, to the amplitudes of the received pulses; the system comprising a storage condenser with no normal leakage paths, a charging circuit across said condenser including a rectifier and a source of said received pulses; a discharging circuit across said condenser comprising the anode-cathode path of a grid-controlled thermionic amplifier, and a high impedance read-out circuit across said condenser, said anode-cathode path being normally conductive to hold a predetermined reference charge on said condenser, and means responsive to said source of received pulses for biasing said amplifier to cut-off only after a predetermined delay after the leading edge of the received pulse.

3. A pulse system comprising a pulse source, a condenser with low-leakage characteristics for storing minute signals, a unidirectional device connected between said source and said condenser for charging said condenser to the level commensurate with the amplitude of a pulse from said source; a discharge circuit including the anode-cathode space of a grid-controlled electron discharge device connected across said condenser, said anode-cathode space being normally conductive to maintain a predetermined charge on said storage condenser, a delay network and a multivibrator connected in series between said pulse source and the grid of said electron discharge device to bias said device to cut off for a predetermined time starting after the initiation of the charging of said condenser, and a high impedance utilization circuit coupled across said discharge circuit.

4. In a pulse stretcher circuit, a storage condenser, a pulse source, a rectifier, said source and rectifier being connected serially across said storage condenser, a discharging circuit connected across said condenser, said discharge circuit comprising the anode-cathode space of a grid-controlled amplifier, the anode-cathode space being normally conductive to maintain a controlled predetermined charge on said condenser, a multivibrator coupled between said pulse source and to the grid of said amplifier, and delay means in circuit with said multivibrator to bias said discharging gate circuit to cut off only a predetermined time after application of a pulse of said source to said condenser.

References Cited in the file of this patent

UNITED STATES PATENTS

| 2,419,340 | Easton | Apr. 22, 1947 |
| 2,572,080 | Wallace | Oct. 23, 1951 |
| 2,767,311 | Meyer | Oct. 16, 1956 |